Patented June 23, 1936

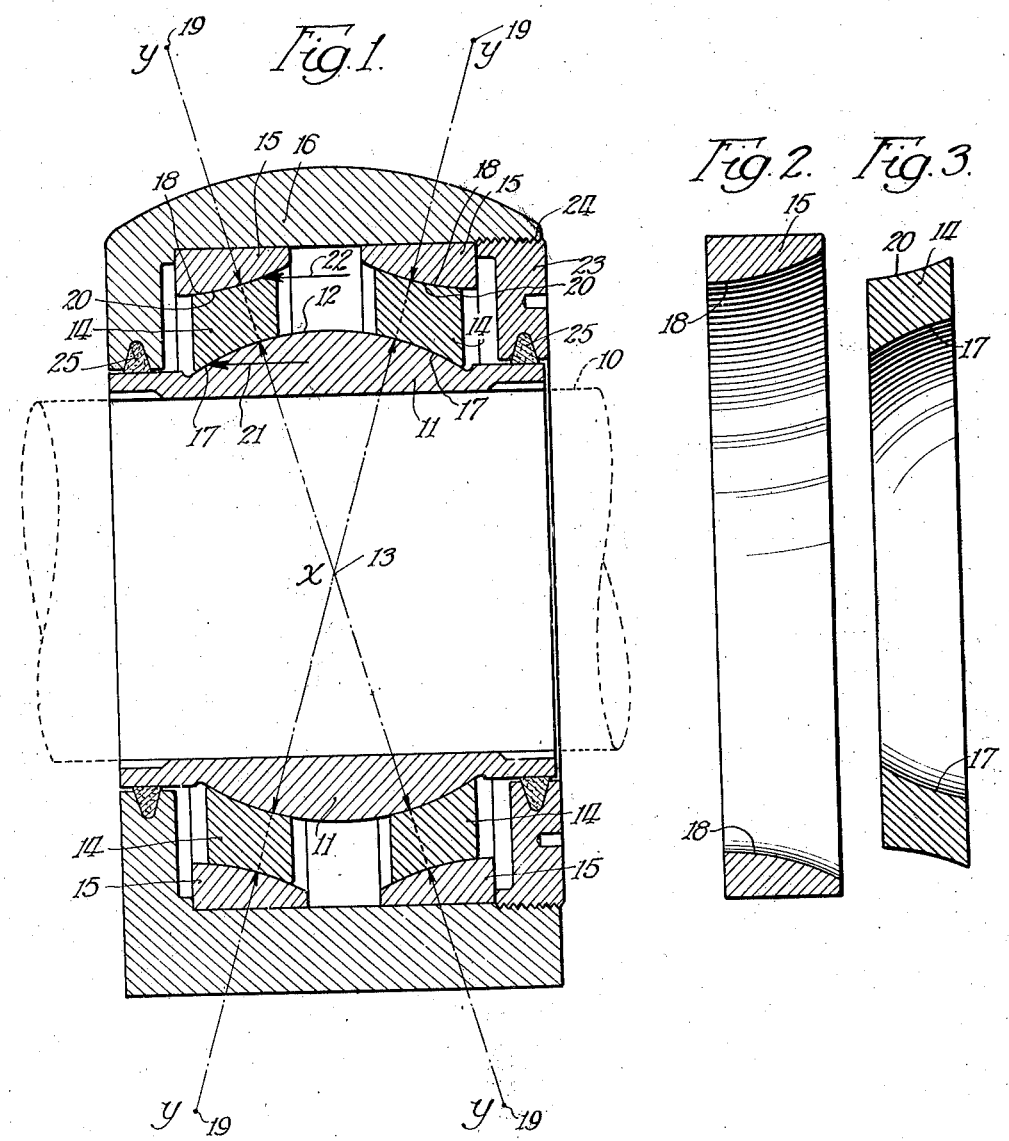
June 23, 1936.  E. D. THOMPSON  2,045,030
BEARING
Filed Dec. 18, 1934
Inventor
Elliott D. Thompson
By Roland C. Rehm
Atty.

2,045,030

UNITED STATES PATENT OFFICE 2,045,030

BEARING

Elliott D. Thompson, Abington, Mass., assignor of one-half to Victor W. Peterson, Chicago, Ill.

Application December 18, 1934, Serial No. 758,104

8 Claims. (Cl. 308—72)

This invention relates to bearings and among other objects aims to provide an improved bearing which will function efficiently under a wide variety of conditions.

The nature of the invention may be readily understood by reference to one construction embodying the invention and illustrated in the accompanying drawing.

In said drawing:

Fig. 1 is a vertical section through a bearing;

Fig. 2 is a section through one of the bearing rings; and

Fig. 3 is a section through another bearing ring.

As here shown, the invention is embodied in a self-aligning bearing wherein the shaft 10 is provided with a spherical bearing member 11 appropriately secured to and centered on the shaft. The details of the devices for tightly securing and centering the bearing member 11 on the shaft have been omitted in order to simplify the drawing. It will be understood that the center 13 of the spherical surface bearing 12 lies in the axis of the shaft.

The bearing member 11 operates in concentric intermediate and outer rings 14 and 15. The outer ring 15 is nonrotatably mounted in the surrounding structure which is here shown in the form of a bearing housing 16, in this instance integral with the supporting pillow block (details of which have been omitted). The intermediate ring 14 is free to rotate relatively both to the bearing member 11 and the outer ring 15. The inner bearing surface 17 of the intermediate ring is made spherical on a radius to conform with the spherical surface of bearing member 11.

In the present instance the bearing is provided with opposed pairs of intermediate and outer rings 14 and 15 arranged to resist thrust in the shaft 10 in both directions. In this connection the bearing surface 18 of the outer ring is transversely convex, the curvature in this instance being circular with centers 19 lying in a circle located by lines $x$—$y$ extending from the center 13 and passing through intermediate portions of the respective bearing rings 14. Stated differently, the centers 19 are located equidistant from center 13 on the surface of circular cones whose apices are at 13 and whose surfaces pass respectively through the rings 14. The radii of transverse curvature of the bearing surfaces 18 may advantageously be equal to the radius of curvature of the surface 12. The outer bearing surface 20 of the intermediate ring is concavely curved to conform with the spherical surface 18 of the outer ring.

The aforesaid arrangement advantageously prevents any tendency of the intermediate bearing ring to bind in transmitting thrust from the spherical bearing member 11 to the outer ring 15. It will be noted that in transmitting thrust say to the left, the thrust of the shaft is delivered to the intermediate ring at 21 near its left edge where the curvature is more nearly transverse to the shaft but is transmitted to the outer ring at 22. Such thrust cannot be transmitted to the outer ring by the outer portion of the intermediate ring since at this point the latter ring increases in thickness to the left. On the other hand, the converging surfaces at the inner halves of the bearing surfaces are inclined at angles which greatly exceed those (about 10°) at which binding or wedging might occur.

The right hand pair of intermediate and outer rings are similarly made and will of course function similarly to the left hand rings in assuming thrusts in the opposite direction.

Where load or other conditions permit, a bearing may be provided with only a single set of rings. In such case the spherical bearing surface need be only half of that shown in Fig. 1. For example, such a single bearing may be placed at each end of a shaft, and if oppositely arranged, thrusts in both directions may be imposed on the shaft.

The bearing may be conveniently adjusted by longitudinal movement of an outer ring 15. In the present instance the right-hand ring 15 is adjusted in or out by the adjusting ring 23 which is carried by the internally threaded end 24 of the bearing housing.

The intermediate rings 14 may advantageously be made of self-lubricating material such as lignum-vitae or self-lubricating bronze. One type of the latter material is formed from powdered bronze or brass (in which copper is the principal element) mixed with graphite and a small quantity of lead, antimony, and tin. These are consolidated by pressure and then sintered. Generally the bearing material is impregnated with lubricating oil. The oil in combination with the graphite renders the material self-lubricating.

It is desirable to enclose the bearing tightly by appropriate felt or other packing 25 at both ends of the bearing housing.

Obviously the intermediate rings may be made of other material and the bearing lubricated by filling the housing with oil. In such case, the intermediate rings 14 preferably are provided with communicating oil grooves and passages which connect the inner and outer bearing surfaces and efficiently distribute lubricant.

In operation the intermediate ring rotates much more slowly than the shaft itself and hence the relative movement at the inner and outer bearing surfaces is substantially reduced. Since the rate of bearing wear seems to be more nearly proportional to the square of the speed, it is obvious that the total wear (for a given rate of shaft rotation) on the inner and outer bearing surfaces is much less than in a simple bearing having an area equivalent to the combined inner and outer bearing surfaces.

The capacity for self-alignment not only minimizes bearing wear, but provides a maximum free bearing surface regardless of deflection of the shaft under load or misalignment of the original installation. The bearings do not require the expert skill necessary for installation of plain bearings and may be mounted on unmachined surfaces without fear of difficulties on that account.

The aforesaid bearing is particularly advantageous in situations where ball and roller bearings have heretofore been essential, and when adequately worn in, approaches ball and roller bearings in efficiency and low friction loss. It is much more quiet in operation than either ball or roller bearings.

Obviously the invention is not limited to the details of the illustrative construction since these may be variously modified. Moreover it is not indispensable that all features of the invention be used conjointly since various features may be used to advantage in different combinations and subcombinations.

Having described my invention, I claim:

1. A self-aligning thrust bearing of the character described comprising in combination a shaft bearing member fixed with respect to the shaft and having a spherical bearing surface whose center lies at the center of the bearing, a surrounding bearing support having a supporting bearing surface which is convex transversely on centers located beyond the center of the bearing in the direction of the shaft thrust, an intermediate bearing ring between said bearing surfaces and transversely curved to conform thereto, said intermediate ring being adapted to receive thrust from the shaft at its trailing edge and to transmit the same with its leading edge to said supporting bearing surface, and means for adjusting said supporting bearing surface axially relative to said spherical bearing surface to compensate for wear.

2. A thrust bearing of the character described comprising in combination a shaft bearing member having a spherical bearing surface rotatable with the shaft, a pair of spaced bearing rings surrounding said bearing spherical surface and having bearing surfaces concavely curved to conform with said spherical bearing surface, a bearing housing carrying a pair of bearing surfaces for said rings, said housing bearing surfaces being transversely curved on centers located on lines extending from the center of curvature of said shaft bearing surface and extending through the respective rings, the outer bearing surfaces of said rings being transversely concavely curved to conform with the respective housing bearing surfaces.

3. A thrust bearing of the character described comprising in combination a shaft bearing member having a spherical bearing surface rotatable with the shaft, a pair of spaced bearing rings made of self-lubricating material and surrounding said bearing surface and having bearing surfaces concavely curved to conform with the contour of said spherical bearing surface, a bearing housing carrying a pair of bearing surfaces for said rings, said housing bearing surfaces being transversely convexly curved on centers located on lines extending from the center of curvature of said shaft bearing surface and extending through the respective rings, the outer bearing surfaces of said rings being concavely curved to conform with the respective housing bearing surfaces.

4. A self-aligning thrust bearing of the character described comprising in combination a shaft bearing member rotatable with the shaft and having a spherical bearing surface whose center lies at the center of the bearing, a surrounding bearing support having a supporting bearing surface located beyond the center of said spherical bearing surface in the direction of thrust of the shaft, said supporting bearing surface having a convex transverse curvature, the centers of which curvature lie in a circle concentric with the bearing axis and located beyond said bearing center in the direction of said thrust, and an intermediate bearing ring between said bearing surfaces and transversely concavely curved to conform to said bearing surfaces respectively, said ring being thereby adapted to transmit shaft thrust to said bearing support without binding or wedging.

5. A self-aligning thrust bearing of the character described comprising in combination a shaft bearing member rotatable with the shaft and having a spherical bearing surface whose center lies at the center of the bearing, a surrounding bearing support having a pair of supporting bearing surfaces located respectively on opposite sides of the center of said spherical bearing surfaces, said supporting bearing surfaces being transversely convexly curved on centers which lie respectively in circles on opposite sides of said bearing center in the direction of shaft thrust, and intermediate bearing rings located between said spherical bearing surface and the respective supporting bearing surfaces, said rings having bearing surfaces curved transversely to conform with the bearing surfaces with which they engage and being adapted thereby respectively to transmit without binding shaft thrusts to the respective supporting bearing surfaces.

6. A self-aligning bearing of the character described comprising in combination a shaft bearing member rotatable with the shaft, and having a spherical bearing surface whose center lies at the center of the bearing, a bearing support, a pair of intermediate bearing rings made of self-lubricating material and located between said spherical bearing surface and said support, said rings being located respectively on opposite sides of the bearing center and having inner bearing surfaces concavely curved to conform with said spherical bearing surface, and adjusting means for relatively moving said rings and said spherical bearing surface to adjust the bearing for wear.

7. A self-aligning thrust bearing of the character described comprising in combination, a supporting bearing structure or the like having a pair of spaced supporting bearing surfaces which are transversely convexly curved, a spherical shaft bearing surface rotatable with the shaft, and a pair of free spaced bearing rings located respectively between said spherical bearing surface and said supporting bearing surfaces and having concavely curved bearing surfaces conforming respectively with said spherical bearing surface and with said supporting bearing surfaces.

8. A self-aligning thrust bearing of the character described comprising in combination, a supporting bearing structure having a supporting bearing surface, a spherical shaft bearing surface rotatable with the shaft, and a free bearing ring between said bearing surfaces and having bearing surfaces conforming respectively with said spherical bearing surface and with said supporting bearing surfaces, said supporting bearing surface being transversely curved about centers located on lines extending from the center of the shaft bearing surface through said ring.

ELLIOTT D. THOMPSON.